United States Patent [19]

Manfredo et al.

[11] 4,303,052
[45] Dec. 1, 1981

[54] CHARGE AIR COOLER MOUNTING ARRANGEMENT

[75] Inventors: Joseph N. Manfredo, Palos Verdes; Selwyn R. Hirsch, Cypress, both of Calif.

[73] Assignee: The Garrett Corporation, Los Angeles, Calif.

[21] Appl. No.: 133,538

[22] Filed: Mar. 24, 1980

[51] Int. Cl.³ ............................................... F28F 1/32
[52] U.S. Cl. ..................................... 123/563; 165/67; 165/149; 29/157.3 R
[58] Field of Search ....................... 123/599, 563, 542; 29/157.3 R; 165/149, 162, 67

[56] References Cited

U.S. PATENT DOCUMENTS

| 2,065,515 | 12/1936 | Cornell | 165/149 |
|---|---|---|---|
| 2,178,095 | 10/1939 | Bowser | 165/149 |
| 3,447,313 | 6/1969 | Stoffel et al. | |
| 3,712,282 | 1/1973 | Isley | |
| 3,775,972 | 12/1973 | Perpall | |
| 3,858,291 | 1/1975 | Perpall | |
| 3,881,455 | 5/1975 | Belsanti | 123/563 |
| 4,075,991 | 2/1978 | Melty et al. | |
| 4,191,148 | 3/1980 | Patel | 123/563 |

Primary Examiner—Ronald H. Lazarus
Attorney, Agent, or Firm—Stuart O. Lowry; Albert J. Miller

[57] ABSTRACT

A charge air cooler for mounting within the intake manifold of a combustion engine. A pair of U-shaped mounting brackets are secured to opposite sides of the charge air cooler, and these brackets carry floating nuts for receiving bolts for mounting the charge air cooler securely within the intake manifold.

20 Claims, 5 Drawing Figures

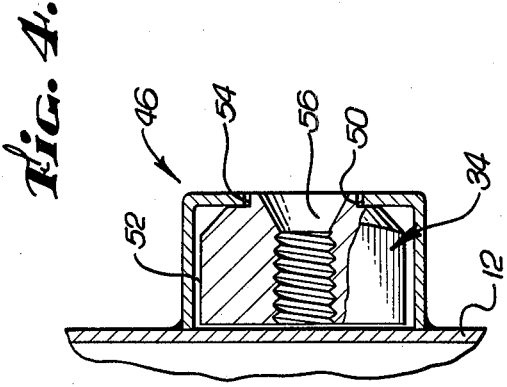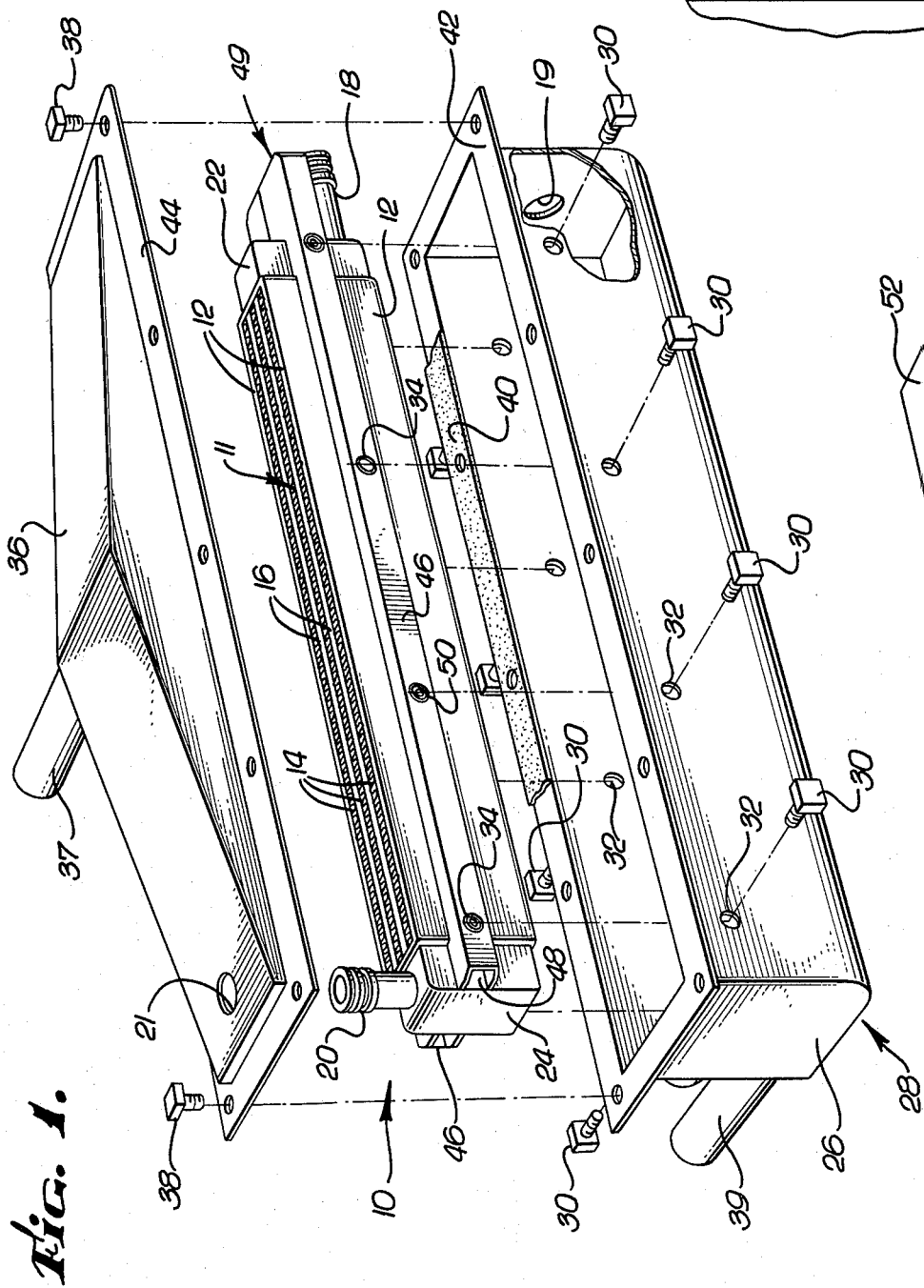

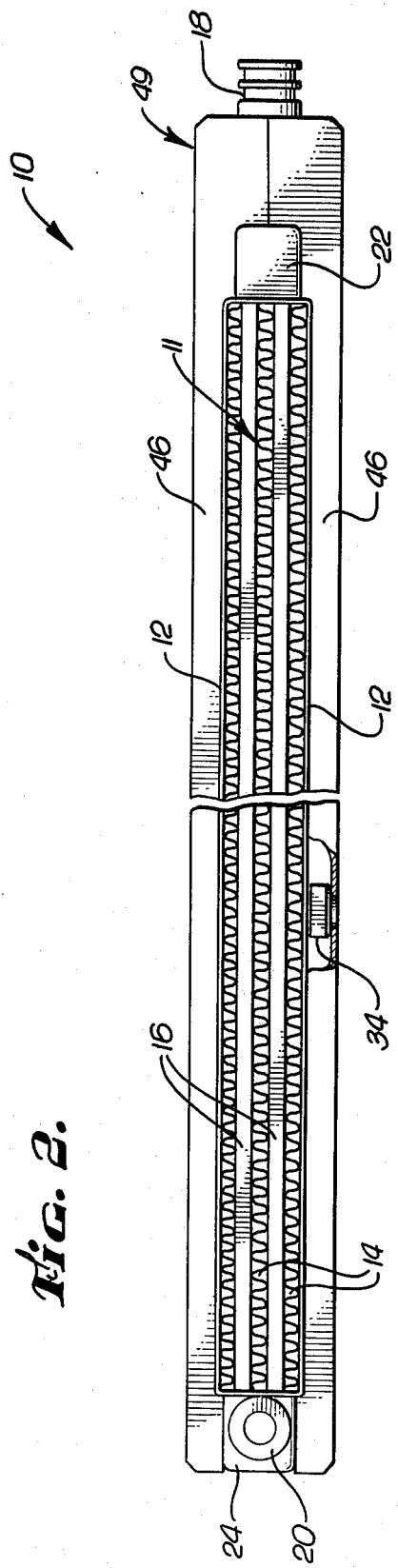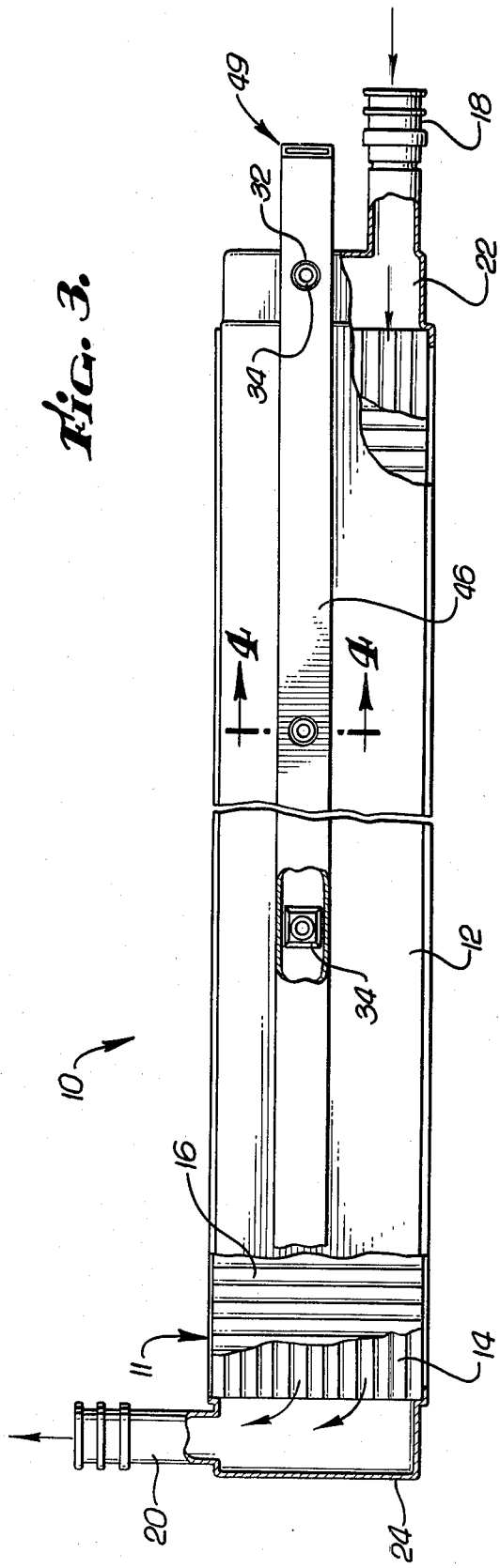

CHARGE AIR COOLER MOUNTING ARRANGEMENT

BACKGROUND OF THE INVENTION

This invention relates to charge air cooler heat exchangers for cooling charge air supplied to a combustion engine. More specifically, this invention relates to an improved arrangement for directly mounting a charge air cooler securely into an engine intake manifold.

Charge air cooler heat exchangers in general are well known in the art. These heat exchangers comprise a heat exchanger core mounted along the flow path of charge air to the intake of a combustion engine. More specifically, in many combustion engines, ambient air is compressed by means such as a supercharger or turbocharger to provide a supply of compressed air to the engine in order to improve overall engine power and performance. However, the ambient air is heated upon compression to undesirably increase the total engine heat load. It is therefore desirable to cool the charge air prior to supply thereof to the engine. In this regard, charge air coolers function to pass the charge air in heat transfer relation with a suitable coolant, such as ambient air or liquid coolant from an engine radiator, prior to supply of the charge air to the engine.

In some applications, it is both convenient and desirable to mount the charge air cooler heat exchanger directly into the air intake manifold of an engine. In this configuration, the charge air passing through the intake manifold also passes through the charge air cooler immediately prior to ingestion by the engine, with suitable plumbing fixtures being provided for circulating liquid coolant from an engine radiator through the cooler in heat transfer relation with the charge air. Typically, such an internally mounted charge air cooler is bolted on opposite sides to the intake manifold, and includes an enlarged external flange for seating between corresponding mating flanges of upper and lower intake manifold sections for aligning the cooler for reception of bolts. However, in spite of the provision of the external flange for positioning the cooler, the size and weight of the various components makes bolting of the cooler into the manifold a difficult and time-consuming manufacturing operation in order to properly align the various bolts with associated threads. Moreover, two gaskets are required to seal the upper and lower faces of the external flange against fluid leakage.

The present invention overcomes the problems and disadvantages of the prior art by providing an improved charge air cooler mounting arrangement which provides means for accurately and easily aligning bolts with associated threads, and which minimizes the required number of fluid seal gaskets.

SUMMARY OF THE INVENTION

In accordance with the invention, a charge air cooler is provided for mounting directly into the intake manifold of a combustion engine. The cooler comprises a longitudinally elongated plate-fin heat exchanger core defining a pair of finned gas flow paths for respective passage of charge air and liquid coolant from an engine radiator in heat exchange relation with each other. The heat exchanger includes a pair of parallel, elongated rigid side plates between which the plate-fin structure is carried. Liquid coolant inlet and outlet headers are carried by the side plates at opposite ends of the core for supply of the coolant through the core.

A pair of mounting brackets have a generally U-shaped cross section, and are rigidly secured respectively to the two side plates with their open ends presented toward said side plates. The mounting brackets include along their lengths a plurality of bolt-receiving openings aligned with corresponding openings formed in the intake manifold. A plurality of bolt-receiving floating nuts are retained between the side plates and the mounting brackets. Each nut includes an axially extending shoulder of reduced cross section for relatively loose reception through an associated one of the bracket bolt holes, and an enlarged base having a cross sectional shape for relatively loose reception within the associated bracket without rotation with respect thereto. The shoulder of each nut retains the nut relatively loosely in general alignment with an associated manifold bolt opening for easy starting of the bolts into the nuts for mounting of the charge air cooler within the intake manifold.

A BRIEF DESCRIPTION OF THE DRAWINGS

The accompanying drawings illustrate the invention. In such drawings:

FIG. 1 is an exploded perspective view illustrating mounting of a charge air cooler in an engine intake manifold.

FIG. 2 is a top plan view of the charge air cooler, with portions broken away;

FIG. 3 is a side elevation of the charge air cooler of FIG. 2;

FIG. 4 is an enlarged vertical section taken on the line 4—4 of FIG. 3; and

FIG. 5 is a perspective view of one of the floating nuts.

DETAILED DESCRIPTION OF THE PREFERRED EMBODIMENT

A charge air cooler 10 is shown in FIG. 1, and generally comprises a plate-fin heat exchanger core 11 mounted between a pair of upstanding and elongated rigid side plates 12. The heat exchanger core 11 includes a plurality of plate-fin elements 14 separated as shown in FIG. 1 by longitudinally extending header bars 16 parallel with the side plates 12. These plate-fin elements 14 define upwardly open flow paths through the core 11 for passage of charge air prior to supply thereof to an internal combustion engine (not shown). The header bars 16 serve to contain another plurality of plate-fin elements (not shown) between the elements 14 and configured for passage of a liquid coolant through the core 11 in heat exchange relation with the charge air. This liquid coolant is preferrably obtained from the radiator cooling system (also not shown) of the engine, and is circulated through the core 11 by means of inlet and outlet tubes 18 and 20 respectively carried at opposite ends of the core side plates 12 by header tanks 22 and 24.

As illustrated in FIG. 1, the charge air cooler 10 is received directly into the hollow lower section 26 of an engine intake manifold 28. The cooler 10 is securely mounted into the intake manifold lower section 26 by a plurality of mounting bolts 30 with its inlet tube 18 received through an aligned opening 19 in the manifold lower section. These mounting bolts 30 are received through bolt holes 32 spaced longitudinally along the length of both sides of the intake manifold lower section 26. The bolts 30 are further received in threaded nuts 34 carried by the charge air cooler 10 for easy starting and reception of the bolts 30, as will be described in more detail. When the charge air cooler 10 is bolted in position within the lower section 26, a manifold upper section 36 including an opening 21 for passage of the outlet tube 20 is secured in a suitable manner as by screws 38 to the intake manifold lower section 26. When the assembly is complete, charge air provided by a supercharger, turbocharger, or the like is circulated into the manifold upper section 36 via a supply pipe 37, and then downwardly through the intake manifold 28 for passage through the charge air cooler 10 for cooling of the charge air. Then, the cooled charge air is supplied to the engine cylinders as by a plurality of cylinder pipes 39. Conveniently, to prevent fluid leakage from the manifold, a single gasket 40 of suitable composition is retained by the screws 38 between mating flanges 42 and 44 on the lower and upper manifold sections, respectively.

The specific construction of the charge air cooler mounting arrangement of this invention is shown in detail in FIGS. 2-4. As shown, a pair of generally U-shaped mounting brackets 46 are secured as by brazing or welding to the opposite side plates 12 of the charge air cooler 10 in a generally opposed relationship. The mounting brackets 46 are sized to run the entire length of the charge air cooler 10, and have their open sides presented toward their associated side plate 12 to define a longitudinally extending rectangular channel 48. Moreover, the mounting brackets 46 are sized so that the subassembly including the charge air cooler 10 and the mounting brackets 46 have a cross-sectional shape corresponding with the cross-sectional dimensions of the intake manifold lower section 26. In this manner, the subassembly is receivable into the lower section 26 with the mounting brackets 46 closely adjacent to the interior wall surfaces of the manifold lower section. In the embodiment shown, this requires the brackets 46 to have an enlarged end extending beyond one end of the cooler core 11, as indicated at 49. These enlarged ends are suitably secured to each other as by welding or brazing.

The mounting brackets 46 each include along their length a series of bolt holes 50 formed in close alignment with the bolt holes 32 in the intake manifold lower section 26. The nuts 34 are relatively loosely or floatingly contained in substantial alignment with the mounting bracket bolt holes 50 for easy reception of an associated mounting bolt 30. More specifically, the nuts 34 each comprise a base 52 having a square cross section with the dimension of each side of the base 52 being slightly less than the vertical clearance of the channel 48. With this construction, the nut 34 is allowed to shift slightly within the channel 48 without rotation with respect to the bracket 46. The base 52 of each nut 34 is formed integrally with an axially extending shoulder 54 of a rounded cross section having a diameter slightly less than the size of the mounting bracket bolt hole 50. The axial length of the nut 34 is such that the nut shoulder 54 projects relatively loosely into the associated bolt hole 50 to retain the nut in position in substantial alignment for receiving a bolt 30. Moreover, this shoulder 54 includes a chamfered bolt-receiving inlet 56 presented toward the inlet manifold lower section 26 for easy starting of the associated mounting bolt 30 into the threaded nut interior.

The charge air cooler 10 is easily and securely mounted within the inlet manifold 28 by dropping the cooler 10 into the manifold lower section 26. The bracket bolt holes 50 and the nuts 34 carried by the mounting bracket 46 will then be in substantial alignment with the bolt holes 32 of the manifold lower section 26. The mounting bolts 30 are then passed through the manifold bolt holes 32, and are easily started into the nuts 34 by virtue of the chamfered nut inlets 56 and the capability of the nuts 34 to float with respect to the mounting bracket 46. However, as the nuts 34 are drawn up tightly over the bolts 30, the base 52 of each nut 34 is prevented from rotating within the associated bracket 46 whereby the mounting brackets 46 are quickly and easily fastened to the intake manifold lower section 26 at several points along the lengths thereof.

The improved charge air cooler mounting arrangement of this invention thus provides mounting brackets for securing the charge air cooler to an inlet manifold at several locations along the entire length of the charge air cooler. The bolts are quickly and easily started into their associated nuts without requiring precise machining or location of the various surfaces and bolt-receiving holes. Moreover, the mounting brackets form baffles within the manifold for preventing bypass passage of charge air around the charge air cooler, and thereby assure that all charge air passes through the cooler in heat exchange relation with the circulated liquid coolant. Still further, no flange as commonly found in the prior art is included for mounting or positioning of the charge air cooler within the manifold, whereby only a single seal or gasket element 40 is required between the intake manifold lower and upper sections 26 and 36.

Various modifications of the improved charge air cooler mounting arrangement of this invention are believed to be possible within the skill of the art. Accordingly, no limitation on the invention described herein is intended except by way of the appended claims.

What is claimed is:

1. A charge air cooler mounting arrangement for mounting a charge air cooler into an engine intake manifold, comprising:
    a charge air cooler for reception into the engine intake manifold, and having a first flow path for passage of charge air, and a second flow path for passage of a coolant in heat transfer relation with the charge air;
    mounting bracket means extending along opposite sides of said cooler and configured to define an elongated channel extending along opposite sides of said cooler, said bracket means having formed therein at least on bolt-receiving hole on each of the opposite cooler sides;
    a plurality of nuts each associated with a different one of the bracket bolt-receiving holes, each of said nuts including an enlarged base configured for relatively loose reception within the channel, and a shoulder configured for extending axially from said base relatively loosely into the associated bracket bolt-receiving hole for relatively loosely retaining said nut within said associated bolt hole;
    a plurality of bolts each associated with a different one of said nuts, and receivable through the manifold and the associated bracket bolt-receiving hole and threadably into said associated nut for securing said cooler with respect to the manifold.

2. A charge air cooler mounting arrangement as set forth in claim 1 wherein said cooler comprises an elongated plate-fin heat exchanger, and including means for coupling liquid coolant for flow through said second flow path.

3. A charge air cooler mounting arrangement as set forth in claim 1 wherein said mounting bracket means comprises a pair of brackets extending along opposite sides of said cooler, and configured to define a pair of channels extending along opposite side of said cooler.

4. A charge air cooler mounting arrangement as set forth in claim 3 wherein each of said pair of brackets comprises a generally U-shaped bracket connected to said cooler with its open side presented toward said cooler.

5. A charge air cooler mounting arrangement as set forth in claim 4 wherein each of said brackets has a plurality of bolt-receiving holes formed therein each at a position generally opposite said cooler.

6. A charge air cooler mounting arrangement as set forth in claim 1 wherein said base of each of said nuts has a generally square cross section for relatively loose reception within the channel without rotation with respect thereto.

7. A charge air cooler mounting arrangement as set forth in claim 1 wherein said base of each of said nuts has a cross-sectional size greater than that of said shoulder.

8. A charge air cooler mounting arrangement as set forth in claim 1 wherein said shoulder of each of said nuts has a generally circular cross section.

9. A charge air cooler mounting arrangement as set forth in claim 1 wherein each of said nuts is sized with respect to the channel and the associated bolt-receiving hole for relatively loose retention in the channel in substantial alignment with the associated bolt-receiving hole without rotation with respect to said mounting bracket means.

10. A charge air cooler mounting arrangement as set forth in claim 1 wherein each of said nuts has a chamfered inlet presented toward the associated bolt for easy reception thereof.

11. A charge air cooler mounting arrangement for mounting a charge air cooler into an engine intake manifold, comprising:
a charge air cooler for reception into the engine intake manifold, said cooler having a first flow path for passage of charge air, and a second flow path for passage of a coolant in heat transfer relation with the charge air;
a pair of brackets extending along opposite sides of said cooler and configured to define a pair of channels extending along opposite sides of said cooler, each of said brackets having formed therein at least one bolt-receiving hole;
a plurality of nuts each associated with a different one of the bracket bolt-receiving holes, each of said nuts having an axially protruding shoulder and an enlarged base, and being receivable relatively loosely within the channel without rotation with respect thereto with said shoulder projecting at least partially into the associated bracket bolt-receiving hole for relatively loosely retaining said nut therein; and
a plurality of bolts each associated with a different one of said nuts, and receivable through the manifold and the associated bracket bolt-receiving hole and threadably into said associated nut for securing said cooler with respect to the manifold.

12. A charge air cooler mounting arrangement as set forth in claim 11 wherein each of said pair of brackets comprises a generally U-shaped bracket connected to said cooler with its open side presented toward said cooler.

13. A charge air cooler mounting arrangement as set forth in claim 11 each of said nuts has a chamfered inlet presented toward the associated bolt for easy reception thereof.

14. In an internal combustion engine system having an intake manifold receiving a charge air cooler for passage of charge air in heat exchange relation with a coolant prior to supply of the charge air to an engine, an arrangement for mounting the charge air cooler within the manifold comprising:
a pair of brackets extending along opposite sides of the cooler and configured to define a pair of channels extending along opposite sides of the cooler, each of said brackets having formed therein at least one bolt-receiving hole, said brackets and cooler together having a size and shape for relatively close reception within the manifold to substantially prevent charge air from bypassing the cooler within the manifold;
a plurality of nuts each associated with a different one of the bracket bolt-receiving holes, each of said nuts having an axially protruding shoulder and an enlarged base, and being receivable relatively loosely within the channel without rotation with respect thereto with said shoulder projecting at least partially into the associated bracket bolt-receiving hole for relatively loosely retaining said nut therein; and
a plurality of bolts each associated with a different one of said nuts, and receivable through the manifold and the associated bracket bolt-receiving hole and threadable into said associated nut for securing said cooler with respect to the manifold.

15. A charge air cooler mounting arrangement as set forth in claim 14 wherein each of said pair of brackets comprises a generally U-shaped bracket connected to said cooler with its open side presented toward said cooler.

16. A charge air cooler mounting arranged as set forth in claim 14 wherein each of said nuts has a chamfered inlet presented toward the associated bolt for easy reception thereof.

17. A method of mounting a charge air cooler within an engine intake manifold, comprising the steps of:
mounting bracket means to extend along opposite sides of the cooler and configured to define an elongated channel extending along opposite sides of the cooler;
forming at least one bolt-receiving hole in the bracket means on each of the opposite cooler sides;
relatively loosely retaining a plurality of nuts within the channel each associated with one of the bolt receiving holes and aligned for reception of a bolt; and
threadably securing into the nuts a plurality of bolts each associated with a different one of the nuts and received through the manifold and associated bolt-receiving hole.

18. The method of claim 17 including chamfering the inlet of each of said nuts for easy reception of said bolts.

19. A method of mounting a charge air cooler within an engine intake manifold, comprising the steps of:

mounting a pair of brackets to extend along opposite sides of the cooler and to define along said sides a pair of elongated channels;

sizing the brackets such that the brackets and cooler together have a size and shape for relatively close reception within the manifold for preventing charge air from bypassing the cooler within the manifold;

forming at least one bolt-receiving hole in each of the brackets;

relatively loosely retaining a plurality of nuts within the channel each associated with one of the bolt-receiving holes and aligned for reception of a bolt; and threadably securing into the nuts a plurality of bolts each associated with a different one of the nuts and received through the manifold and associated bolt-receiving hole.

20. The method of claim 19 including chamfering the inlet of each of said nuts for easy reception of said bolts.

* * * * *

UNITED STATES PATENT AND TRADEMARK OFFICE
CERTIFICATE OF CORRECTION

PATENT NO. : 4,303,052

DATED : December 1, 1981

INVENTOR(S) : JOSEPH N. MANFREDO et al

It is certified that error appears in the above-identified patent and that said Letters Patent are hereby corrected as shown below:

Column 4, line 52, change "on" (first occurrence) to --one--;

Column 5, line 8, change "side" to --sides--.

Signed and Sealed this

Twenty-third Day of March 1982

[SEAL]

Attest:

GERALD J. MOSSINGHOFF

Attesting Officer     Commissioner of Patents and Trademarks